US012286561B2

(12) United States Patent
Tsunematsu et al.

(10) Patent No.: US 12,286,561 B2
(45) Date of Patent: Apr. 29, 2025

(54) INFRARED-ABSORBING FINE PARTICLE-CONTAINING COMPOSITION AND METHOD FOR PRODUCING THE SAME

(71) Applicant: SUMITOMO METAL MINING CO., LTD., Tokyo (JP)

(72) Inventors: Hirofumi Tsunematsu, Isa (JP); Takeshi Chonan, Isa (JP); Mika Okada, Isa (JP); Hideaki Fukuyama, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 541 days.

(21) Appl. No.: 17/623,564

(22) PCT Filed: Jul. 9, 2020

(86) PCT No.: PCT/JP2020/026808
§ 371 (c)(1),
(2) Date: Dec. 28, 2021

(87) PCT Pub. No.: WO2021/014983
PCT Pub. Date: Jan. 28, 2021

(65) Prior Publication Data

US 2022/0251400 A1 Aug. 11, 2022

(30) Foreign Application Priority Data

Jul. 23, 2019 (JP) ................................ 2019-135457

(51) Int. Cl.
*C09D 5/32* (2006.01)
*C09D 7/61* (2018.01)
(Continued)

(52) U.S. Cl.
CPC ................. *C09D 5/32* (2013.01); *C09D 7/61* (2018.01); *C09D 11/03* (2013.01); *C09D 171/00* (2013.01)

(58) Field of Classification Search
CPC ............ C09D 5/32; C09D 11/03; C09D 7/61; C09D 171/00
See application file for complete search history.

(56) References Cited

U.S. PATENT DOCUMENTS

2004/0071957 A1 4/2004 Fujita
2006/0178254 A1 8/2006 Takeda et al.
(Continued)

FOREIGN PATENT DOCUMENTS

EP 2 360 220 A1 8/2011
EP 3 492 544 A1 6/2019
(Continued)

OTHER PUBLICATIONS

Jan. 25, 2022 International Preliminary Report on Patentability issued in International Patent Application No. PCT/JP2020/026808.
(Continued)

*Primary Examiner* — Bijan Ahvazi
(74) *Attorney, Agent, or Firm* — Oliff PLC

(57) ABSTRACT

An infrared-absorbing fine particle-containing composition, including: infrared absorbing fine particles, a dispersant, and a solvent, wherein the dispersant has a polyether structure, has a glass transition temperature of −150° C. or higher and 0° C. or lower, and is contained in an amount of 10 parts by mass or more with respect to 100 parts by mass of the infrared absorbing fine particles, and a solvent content is 10 mass % or less.

6 Claims, 1 Drawing Sheet

11
12
11
12

(51) Int. Cl.
*C09D 11/03* (2014.01)
*C09D 171/00* (2006.01)

(56) References Cited

U.S. PATENT DOCUMENTS

2008/0075936 A1 3/2008 McGurran et al.
2008/0075963 A1* 3/2008 Dershem .................... C09J 4/00 524/425
2010/0210772 A1* 8/2010 Hiwatashi ................ G02B 5/22 524/406
2011/0297899 A1 12/2011 Tofuku
2012/0183763 A1 7/2012 Ito et al.
2018/0016459 A1 1/2018 Okada et al.
2019/0161361 A1 5/2019 Tsunematsu et al.

FOREIGN PATENT DOCUMENTS

JP 2004-162020 A 6/2004
JP 2004231708 A * 8/2004 ............... C08K 9/00
JP 2008-024902 A 2/2008
JP 2009235240 A * 10/2009 ............ C08L 101/12
JP 2010-501372 A 1/2010
JP 2011001551 A * 1/2011 ............... C08K 9/04
JP 2012-184414 A 9/2012
JP 2013107917 A * 6/2013 ........... C03C 17/007
JP 2016-050262 A 4/2016
JP 2017-197633 A 11/2017
JP 2018141116 A * 9/2018 ............. C09D 17/00
WO 2005/037932 A1 4/2005
WO 2012/103578 A1 8/2012
WO 2013/034533 A2 3/2013
WO 2016/121844 A1 8/2016

OTHER PUBLICATIONS

Jul. 28, 2023 Extended European Search Report Issued in European Patent Application No. 20843800.2.
Sep. 29, 2020 Search Report issued in International Patent Application No. PCT/JP2020/026808.

* cited by examiner

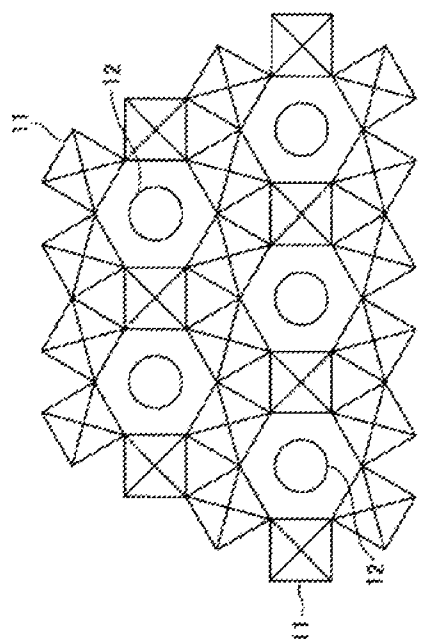
11
12
12
11

INFRARED-ABSORBING FINE PARTICLE-CONTAINING COMPOSITION AND METHOD FOR PRODUCING THE SAME

TECHNICAL FIELD

The present invention relates to an infrared-absorbing fine particle-containing composition that transmits light in a visible light region and absorbs light in an infrared region and a method for producing the same.

DESCRIPTION OF RELATED ART

Various techniques have been proposed so far as a heat ray shielding technique for reducing a solar radiation transmittance while maintaining transparency by having a good visible light transmittance. Among them, a heat ray shielding technique using infrared absorbing fine particles and a dispersion body of the infrared absorbing fine particles, has advantages such as excellent heat ray shielding characteristics, low cost, radio wave transmission, and high weather resistance, compared with other techniques.

In Patent Document 1, the present inventors disclose an infrared shielding material fine particle dispersion body in which infrared shielding material fine particles are dispersed in a medium, excellent optical characteristics, conductivity of the infrared shielding material fine particle dispersion body, and a method for producing the same.

As a method for producing the infrared shielding material fine particle dispersion body described in Patent Document 1, for example, the following method has been adopted.

First, an infrared shielding material fine particle dispersion liquid using an organic solvent as a solvent, is prepared. A binder or the like is added to the infrared shielding material fine particle dispersion liquid to obtain a dispersion liquid for forming an infrared shielding film. The obtained dispersion liquid for forming an infrared shielding film is applied onto a transparent base material, and then the organic solvent is dried and removed. Thereby, the infrared shielding film which is an infrared shielding material fine particle dispersion body, is directly laminated on a surface of the transparent base material.

However, in the above method, the organic solvent must be removed by a drying treatment. Therefore, this was contrary to a recent tendency of various industrial materials to reduce an environmental load. Then, as an alternative technique, a dispersion liquid for forming an infrared shielding film using water as a main solvent was also studied. However, the dispersion liquid for forming an infrared shielding film using the water as the main solvent has a problem such as a poor wettability to a transparent base material, and such that a drying condition of the solvent is greatly affected by an environmental temperature and humidity at the time of application, and it was avoided for use in the market.

Therefore, in Patent Document 2, the present inventors disclose a near infrared absorbing fine particle dispersion liquid whose viscosity is 180 mPa·S or less by adding near-infrared absorbing fine particles containing a composite tungsten oxide represented by a general formula MxWyOz in an amount of 10 mass % or more and 25 mass % or less, to one or more kinds of solvents selected from vegetable oils or compounds derived from vegetable oils, and pulverizing and dispersing the mixture.

PRIOR ART DOCUMENT

Patent Document

[Patent Document 1] International Publication No. 2005/37932

[Patent Document 2] International Publication No. 2016/121844

SUMMARY OF THE INVENTION

Problem to be Solved by the Invention

However, as a result of expanding the applications of the near-infrared absorbing fine particle dispersion liquid described in Patent Document 2, a new problem has been found. One of the problems was that the content of the near-infrared absorbing fine particles was low in the near-infrared absorbing fine particle dispersion liquid.

For example, when the near-infrared absorbing fine particle dispersion liquid is applied to offset printing, a printing film does not necessarily require transparency in printing applications. Therefore, the printing film containing a high concentration of near-infrared absorbing fine particles is formed in some cases. Here, the present inventors found that it is appropriate to set the content of the near-infrared absorbing fine particles in the dispersion liquid to 25 mass % or more.

On the other hand, the near-infrared absorbing fine particle dispersion liquid is used when producing an infrared absorbing fine particle dispersion body used in various fields. However, a required content of the near-infrared absorbing fine particles varies depending on the use of the infrared absorbing fine particle dispersion body. Here, the present inventors found a near-infrared absorbing fine particle dispersion liquid having a large concentration adjustment allowance, because a content of the near-infrared absorbing fine particles in the dispersion liquid is high and a content of the solvent (solvent content) is low so that the content of the near-infrared absorbing fine particles can be adjusted by appropriately adding a diluting solvent to the near-infrared absorbing fine particle dispersion liquid.

However, there is a problem that when the content of the near-infrared absorbing fine particles in the near-infrared absorbing fine particle dispersion liquid described in Patent Document 2 becomes 25 mass % or more, storage stability deteriorates when the dispersion liquid is stored for a long period of time. Specifically, for example, when the storage period is about one month, the dispersion liquid maintains a good dispersion state. However, when the storage period was more than half a year, there were many practical obstacles such as aggregation of near-infrared absorbing fine particles and separation of dispersant and vegetable oil.

Further, the present inventors also found a problem as follows: for example, in printing applications, even the near-infrared absorbing fine particle dispersion liquid described in Patent Document 2 has a high solvent content and insufficient viscosity.

The present invention has been made under the circumstances described above, and an object of the present invention is to provide an infrared-absorbing fine particle-containing composition having a low solvent content and a high long-term storage stability and a method for producing the same.

Means for Solving the Problem

In order to solve the above-described problems, the present inventors have studied the composition of the infrared-absorbing fine particle-containing composition having a low solvent content and a high long-term storage stability.

As a result of the research, the present inventors found that the above-described infrared-absorbing fine particle-containing composition can be realized, by using a dispersant having excellent affinity with surfaces of the infrared absorbing fine particles and having a glass transition temperature of −150° C. or higher and 0° C. or lower. Thus, the present invention is completed.

That is, in order to solve above-described problems, a first invention provides an infrared-absorbing fine particle-containing composition, including:

- infrared absorbing fine particles, a dispersant, and a solvent,
- wherein the dispersant has a polyether structure, has a glass transition temperature of −150° C. or higher and 0° C. or lower, and is contained in an amount of 10 parts by mass or more with respect to 100 parts by mass of the infrared absorbing fine particles, and
- a solvent content is 10 mass % or less.
- the second invention provides the infrared-absorbing fine particle-containing composition according to the first invention, wherein a content of the infrared absorbing fine particles is 25 mass % or more.

A third invention provides the infrared-absorbing fine particle-containing composition according to the first or second invention, wherein the infrared absorbing fine particles are compounds represented by a general formula MxWyOz (wherein M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, W is tungsten, O is oxygen, and satisfying $0.001 \leq x/y \leq 1$, $2.0 \leq z/y \leq 3.0$).

A fourth invention provides the infrared-absorbing fine particle-containing composition according to any one of the first to third inventions, wherein the dispersant has one or more functional groups selected from an amino group, a hydroxyl group, a carboxyl group, a sulfo group, a phospho group and an epoxy group.

A fifth invention provides the infrared-absorbing fine particle-containing composition according to any one of the first to fourth inventions, wherein a viscosity of the infrared-absorbing fine particle-containing composition is 200 mPa·s or more and 20000 mPa·s or less.

A sixth invention provides the infrared-absorbing fine particle-containing composition according to any one of the first to fifth inventions, wherein a crystallite diameter of the infrared absorbing fine particles is 1 nm or more and 100 nm or less.

A seventh invention provides a method for producing an infrared-absorbing fine particle-containing composition, including:

- mixing and dispersing infrared absorbing fine particles and a dispersant having a polyether structure and a glass transition temperature of −150° C. or higher and 0° C. or lower in 80 parts by mass or more of a solvent with respect to 100 parts by mass of the infrared absorbing fine particles, to produce an infrared absorbing fine particle dispersion liquid; and
- drying the infrared absorbing fine particle dispersion liquid to produce an infrared-absorbing fine particle-containing composition having a solvent content of 10 mass % or less.

Advantage of the Invention

An infrared-absorbing fine particle-containing composition according to the present invention has a high long-term storage stability despite its low solvent content. As a result, it is excellent in application to an infrared absorbing fine particle dispersion body used in various fields including printing ink applications.

BRIEF DESCRIPTION OF THE DRAWINGS

FIG. 1 is a schematic view of a crystal structure of a composite tungsten oxide having hexagonal crystals.

DETAILED DESCRIPTION OF THE INVENTION

Embodiments for implementing the present invention will be described in an order of [1] Infrared-absorbing fine particle-containing composition, [2] Infrared absorbing fine particle dispersion body, and [3] Infrared absorbing effect of the infrared absorbing fine particle dispersion body.

[1] Infrared-Absorbing Fine Particle-Containing Composition

An infrared-absorbing fine particle-containing composition according to the present invention is an infrared-absorbing fine particle-containing composition containing infrared absorbing fine particles, a dispersant, and a solvent, wherein the dispersant has a polyether structure and has a glass transition temperature of −150° C. or higher and 0° C. or lower, and is contained in an amount of 10 parts by mass or more with respect to 100 parts by mass of the infrared absorbing fine particles, and a solvent content is 10 mass % or less.

The infrared-absorbing fine particle-containing composition according to the present invention will be described in an order of (1) Infrared absorbing fine particles, (2) Dispersant, (3) Solvent, (4) Infrared-absorbing fine particle-containing composition, (5) Method for producing the infrared-absorbing fine particle-containing composition.

(1) Infrared Absorbing Fine Particles

As the infrared absorbing fine particles used in the infrared absorbing fine particles-containing composition according to the present invention, various infrared absorbing fine particles can be used. For example, it is preferable to use infrared absorbing fine particles containing various materials containing free electrons, and tungsten oxide with oxygen deficiency, composite tungsten oxide, etc., can be preferably used, and also infrared absorbing fine particles containing various inorganic materials such as ITO (indium tin oxide) and ATO (antimony tin oxide) can be preferably used.

In general, it is known that a material containing free electrons exhibits a reflective absorption response by plasma vibration, to electromagnetic waves around an area of a sun light having a wavelength of 200 nm to 2600 nm. Therefore, various materials including free electrons can be suitably used as infrared absorbing fine particles. Further, when the infrared absorbing fine particles are the fine particles having a diameter smaller than a wavelength of a light, geometric scattering in a visible light region (wavelength 380 nm to 780 nm) can be reduced, and it is preferable because it is possible to obtain high transparency in particular for the visible light region.

In the present invention, "transparency" is used in the sense that "there is little scattering and high transparency to the light in the visible light region."

Further, a dispersed particle size of the infrared absorbing fine particles can be selected depending on the purpose of use thereof.

First, in the case of use in the application that requires to maintain transparency, it is preferable that the infrared absorbing fine particles have a dispersed particle size of 800 nm or less. This is because particles having a dispersed particle size of 800 nm or less do not completely shield the light by scattering, and maintain a visibility in the visible light region, and can easily maintain transparency efficiently at the same time.

In particular, when emphasizing the transparency in the visible light region, it is preferable to consider a reduction of scattering by particles.

When emphasizing the reduction of scattering by particles, the dispersed particle size is preferably 200 nm or less, and more preferably 100 nm or less. This is because a small particle size makes it possible to avoid an infrared absorbing film from becoming like cloudy glass, resulting in a failure to obtain sharp transparency, as a result of reducing the scattering by geometry scattering or Me scattering of the light having a wavelength of 400 nm or more and 780 nm or less in the visible light region. That is, when the dispersed particle size is 200 nm or less, the above-described geometric scattering or Me scattering is reduced, and a Rayleigh scattering region is produced. In the Rayleigh scattering region, scattered light is reduced in proportion to 6-th power of the particle size, and therefore the scattering is reduced and the transparency is improved due to the decrease in the dispersed particle size.

Further, when the dispersed particle size is 100 nm or less, the scattered light is very small and it is preferable. From a viewpoint of avoiding the scattering of light, it is preferable to have a small dispersed particle size.

A lower limit value of the dispersed particle size of the infrared absorbing fine particles is not particularly limited, but for example, since it can be easily produced industrially, the dispersed particle size is preferably 1 nm or more.

On the other hand, by setting the dispersed particle size of the infrared absorbing fine particles to 800 nm or less, a haze value of the infrared absorbing fine particle dispersion body in which the infrared absorbing fine particles are dispersed in a medium, can be 30% or less when a visible light transmittance is 85% or less. Since the haze value is 30% or less, the infrared absorbing fine particle dispersion body can be prevented from becoming like a cloudy glass, and a sharp transparency can be obtained.

The dispersed particle size of the infrared absorbing fine particles can be measured using ELS-8000 manufactured by Otsuka Electronics Co., Ltd., based on dynamic light scattering as a principle.

Further, from a viewpoint of making the infrared absorbing fine particles exhibit excellent infrared absorption characteristics, a crystallite diameter of the infrared absorbing fine particles is preferably 1 nm or more and 100 nm or less, more preferably 1 nm or more and 60 nm or less, more preferably 15 nm or more and 50 nm or less, and even more preferably 20 nm or more and 40 nm or less.

For the measurement of the crystallite diameter of the infrared absorbing fine particles, the measurement of an X-ray diffraction pattern by a powder X-ray diffraction method (θ-2θ method) and an analysis by a Rietveld method can be used. The X-ray diffraction pattern can be measured by using, for example, a powder X-ray diffractometer "X'Pert-PRO/MPD" manufactured by PANalytical Co., Ltd. of Spectris Co., Ltd.

Further, it is preferable that the surface of the infrared absorbing fine particles according to the present invention is coated with an oxide containing one or more of Si, Ti, Zr, Al, and Zn from a viewpoint of improving a weather resistance of the infrared absorbing fine particles. A coating method is not particularly limited, but by adding the above-described metal alkoxide to the solution in which the infrared absorbing fine particles are dispersed, the surface of the infrared absorbing fine particles can be coated.

As the infrared absorbing fine particles, infrared absorbing fine particles containing one or more selected from a tungsten oxide having an oxygen deficiency and a composite tungsten oxide, can be particularly preferably used.

$WO_3$ having an oxygen deficiency and composite tungsten oxide obtained by adding a positive element such as Na to $WO_3$, are known to be conductive materials and materials having free electrons. Then, analysis of single crystals and the like of the materials having these free electrons suggests a response of free electrons to light in an infrared region.

The infrared absorbing fine particles containing tungsten oxide or composite tungsten oxide largely absorb light in a near infrared region, particularly in the vicinity of a wavelength of 1000 nm, and therefore its transparent color tone is in a range of blue to green in many cases.

According to the study by the present inventors, in a specific part of a composition range of tungsten and oxygen, there is a range that is particularly effective as an infrared absorbing material, and it can be a tungsten oxide or a composite tungsten oxide that is transparent in the visible light region and has particularly strong absorption in the infrared region. Therefore, as a material for the infrared absorbing fine particles that can be suitably used in the method for producing an infrared absorbing fine particle dispersion liquid of the present embodiment, explanation will be further given in an order of <1> Tungsten oxide and <2> Composite tungsten oxide.

<1> Tungsten Oxide

Tungsten oxide is represented by a general formula WyOz (where W is tungsten, O is oxygen, $2.2 \leq z/y \leq 2.999$).

In the composition range of the tungsten and oxygen of the tungsten oxide represented by a general formula WyOz, a composition ratio (z/y) of oxygen to tungsten is preferably less than 3, more preferably $2.2 \leq z/y \leq 2.999$, and even more preferably, $2.45 \leq z/y \leq 2.999$.

When the value of z/y is 2.2 or more, it is possible to avoid an appearance of an unintended crystal phase of $WO_2$ in the tungsten oxide, and since it is possible to obtain chemical stability as a material, the tungsten oxide serves as particularly effective infrared absorbing fine particles.

Further, since the value of z/y is preferably less than 3, more preferably 2.999 or less, a particularly sufficient amount of free electrons are generated to enhance absorption/reflection characteristics in the infrared region, and efficient infrared absorption fine particles can be obtained.

Further, a so-called "magneti phase" having a composition ratio represented by $2.45 \leq z/y \leq 2.999$ is chemically stable, and is excellent in the light absorption characteristics in the near infrared region, and therefore can be more preferably used as an infrared absorbing material. Therefore, the value of z/y is more preferably $2.45 \leq z/y \leq 2.999$ as described above.

<2> Composite Tungsten Oxide

The composite tungsten oxide is obtained by adding an element M described later to the above-described tungsten oxide ($WO_3$). By adding the element M to the tungsten oxide to form a composite tungsten oxide, free electrons are generated in $WO_3$, and in particular, strong absorption characteristics derived from the free electrons are exhibited in the near infrared region, and it is effective as infrared absorbing fine particles at a wavelength of around 1000 nm.

That is, the composite tungsten oxide is obtained as follows: control of an amount of oxygen and addition of the element M that generates free electrons are used in combination to $WO_3$, and therefore, more efficient infrared absorption characteristics can be exhibited. When a general formula of the composite tungsten oxide obtained by using the control of the amount of oxygen and the addition of the element M that generates free electrons in combination to $WO_3$, is described as MxWyOz, it is preferable to satisfy a relationship of $0.001 \leq x/y \leq 1$ and $2.0 \leq z/y \leq 3.0$. In the above general formula, M represents the above-described element M, W represents tungsten, and O represents oxygen.

As described above, when the value of x/y indicating the amount of the added element M is 0.001 or more, a particularly sufficient amount of free electrons are generated in the composite tungsten oxide, and a high infrared absorption effect can be obtained. Then, as the amount of the added element M increases, a supply amount of the free electrons increases and an infrared absorption efficiency also increases, but the effect is saturated when the value of x/y is about 1. Further, when the value of x/y is 1 or less, it is preferable because it is possible to avoid a formation of an impurity phase in the infrared absorbing fine particles containing the composite tungsten oxide.

The element M is preferably one or more elements selected from H, He, alkali metal, alkaline earth metal, rare earth element, and Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb.

From a viewpoint of particularly enhancing the stability in MxWyOz, the element M is, more preferably, one or more elements selected from alkaline metal, alkaline earth metal, rare earth element, and Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re.

Then, from a viewpoint of improving optical characteristics and weather resistance as infrared absorbing fine particles containing the composite tungsten oxide, the element M is more preferably one or more elements selected from alkaline earth metal elements, transition metal elements, group 4B elements, and group 5B elements.

Regarding a z/y value, which indicates an addition amount of oxygen, the same mechanism as the above-described tungsten oxide represented by WyOz works also in the composite tungsten oxide represented by MxWyOz, and in addition, even at z/y=3.0, there is a supply of free electrons depending on the addition amount of the element M as described above. Therefore, $2.0 \leq z/y \leq 3.0$ is preferable, $2.2 \leq z/y \leq 3.0$ is more preferable, and $2.45 \leq z/y \leq 3.0$ is even more preferable.

Further, when the composite tungsten oxide has a hexagonal crystal structure, the transmission of light in the visible light region is improved and the absorption of light in the infrared region is improved, for the infrared absorbing fine particles containing the composite tungsten oxide. This will be described with reference to FIG. 1, which is a schematic plan view of the crystal structure of the hexagonal crystal. FIG. 1 is a plan view of the crystal structure of the composite tungsten oxide having a hexagonal structure when viewed from a (001) direction.

In FIG. 1, six octahedrons 11 formed by $WO_6$ units are assembled to form a hexagonal void, and an element 12 which is an element M is arranged in the void to form one unit, and a large number of the one unit are assembled to form a hexagonal crystal structure.

Then, in order to improve the transmission of light in the visible light region and the absorption of light in the infrared region, the unit structure described with reference to FIG. 1, is preferably included in the composite tungsten oxide, and it doesn't matter whether the composite tungsten oxide is crystalline or amorphous.

When the cation of the element M is added and exists in the hexagonal voids described above, the transmission of light in the visible light region is improved and the absorption of light in the infrared region is improved. Here, in general, the hexagonal crystal is likely to be formed when the element M having a large ionic radius is added. Specifically, the hexagonal crystal is likely to be formed when one or more selected from Cs, K, Rb, Tl, In, Ba, Li, Ca, Sr, Fe, and Sn are added as the element M. Of course, elements other than these are acceptable, and the elements are not limited to the above-described elements as long as the above-described element M exists in the hexagonal voids formed by $WO_6$ units.

Since the composite tungsten oxide having a hexagonal crystal structure has a uniform crystal structure, the addition amount of the element M is preferably 0.2 or more and 0.5 or less, more preferably 0.33, as the value of x/y in the above-described general formula. When the value of x/y is 0.33, it is considered that the above-described element M is arranged in all the hexagonal voids.

Further, infrared absorbing fine particles containing composite tungsten oxides of tetragonal and cubic crystals other than hexagonal crystals, also have sufficiently effective infrared absorption characteristics. An absorption position in the infrared region tends to change and the absorption position tends to move to a longer wavelength side in an order of cubic<tetragonal<hexagonal, depending on the crystal structure. Further, along with this tendency, the light absorption in the visible light region is less in an order of hexagonal crystal, tetragonal crystal, and cubic crystal. Accordingly, hexagonal composite tungsten oxide is preferably used for applications that transmit light more in a visible light region and shield light more in an infrared region. However, the tendency of the optical characteristics described here is only a rough tendency and changes depending on the type of added element, the addition amount of the element, and the amount of oxygen, and the present invention is not limited thereto.

(2) Dispersant

The dispersant used in the infrared-absorbing fine particle-containing composition according to the present invention has a polyether structure and has a glass transition temperature of −150° C. or higher and 0° C. or lower, and it is a dispersant having an excellent affinity with a surface of the infrared absorbing fine particles described above.

<1> Chemical Structure of Dispersant

Further, as the dispersant according to the present invention, those having one or more selected from an amino group, a hydroxyl group, a carboxyl group, a sulfo group, a phospho group and an epoxy group as a functional group in the polyether structure as a main chain, can be preferably used. These functional groups have an effect of adsorbing on the surface of infrared absorbing fine particles to prevent the fine particles from aggregating and uniformly dispersing them. Further, the dispersant according to the present invention preferably does not contain a solvent, and those having a solid content of 95 mass % or more are preferable. An acid value of the dispersant is preferably 0 to 10 mgKOH/g, and an amine value is preferably 30 to 80 mgKOH/g.

Preferable specific examples of a commercially available dispersant include: SOLPERSE (registered trademark)

20000 (same below) manufactured by Japan Lubrizol Co., Ltd., Disparlon (registered trademark) DA234 and DA325, DA375 manufactured by Kusumoto Kasei Co., Ltd.

In the present invention, a "solid content" means an active ingredient in the dispersant, and its properties include liquid ones and solid ones, and it is considered separately from a solvent described later in "(3) Solvent" of the present invention.

<2> Glass Transition Temperature of Dispersant

It is found by the present inventors that by using the dispersant having a polyether structure and a glass transition temperature of −150° C. or higher and 0° C. or lower as the dispersant used in the infrared-absorbing fine particle-containing composition, an infrared-absorbing fine particle-containing composition having excellent storage stability during long-term storage such as, for example, a 12-month period at 25° C., can be obtained even when the solvent content is 10 mass % or less. From a viewpoint of enhancing storage stability, the glass transition temperature is preferably −100° C. or higher and 0° C. or lower.

Here, in general, the glass transition temperature is the temperature that allows viscosity of a solid, which is unmeasurable at low temperatures, to decrease in a narrow temperature range and the fluidity increases when a predetermined amorphous solid is heated. Then, by using the dispersant having a glass transition temperature of 0° C. or lower for the infrared-absorbing fine particle-containing composition according to the present invention, the infrared absorbing fine particles dispersed in the dispersant in the liquid state, maintain a dispersed state without causing reaggregation or sedimentation phenomenon because the dispersant is a liquid in a stored state.

On the other hand, in a process of producing the infrared-absorbing fine particle-containing composition according to the present invention, or when using the infrared-absorbing fine particle-containing composition according to the present invention, the infrared-absorbing fine particle-containing composition is heated to a temperature equal to or higher than a glass transition temperature, and an appropriate amount of solvent is added to obtain an infrared-absorbing fine particle dispersion liquid. As a result, the infrared absorbing fine particles are uniformly mixed with the dispersant without aggregation, in the infrared absorbing fine particle dispersion liquid. Then, if necessary, the infrared absorbing fine particles are uniformly mixed with a resin, etc., or an additive, etc., added to the infrared absorbing fine particle dispersion liquid.

<3> Method for Measuring Glass Transition Temperature

A differential scanning calorimetry (DSC) is used to measure the glass transition temperature. Further, a low temperature type DSC capable of cooling a measurement sample by an electric cooling system or liquid nitrogen or the like, is preferably used to measure the glass transition temperature in a low temperature region of 0° C. or lower. For example, a differential scanning calorimeter "DSC 3500 Sirius" manufactured by Netch Japan Co., Ltd. can be used.

(3) Solvent

As the solvent used in the infrared-absorbing fine particle-containing composition according to the present invention, any material may be used as long as it has good compatibility with the above-described dispersant and can uniformly mix the infrared absorbing fine particles into the dispersant. Specifically, it is preferable to use the solvent having a low viscosity and good compatibility with the above-described dispersant, and can be easily removed in the step of "drying treatment" in "(5) Method for producing infrared-absorbing fine particle-containing composition" described later.

As a preferable specific example, various solvents can be used, and it is possible to use alcohols such as water, alcohols such as etanol, propanol, butanol, isopropyl alcohol, isobutyl alcohol, diacetone alcohol, etc., ethers such as methyl ether, ethyl ether, propyl ether, propylene glycol monomethyl ether acetate, etc., esters, ketones such acetone, methyl ethyl ketone, diethyl ketone, cyclohexanone, isobutyl ketone, etc., and aromatic hydrocarbons such as toluene and styrene.

(4) Infrared-Absorbing Fine Particle-Containing Composition

The infrared-absorbing fine particle-containing composition according to the present invention is used by further adding a solvent, a dispersant, a coupling agent, a surfactant, a binder, a resin, a pigment, a paint, etc., depending on its use, and is processed into printing inks, printing films, dispersion liquid for forming coating films, an infrared absorbing fine particle dispersion body, and the like.

At this time, a concentration of the infrared absorbing fine particles after processing is required be set to a certain value or more, depending on a processed product. For example, there are cases where a film thickness of a coating film, being formed on a substrate, is suppressed to a predetermined value or less, and cases where there are restrictions on an addition amount of the pigment when the infrared absorbing fine particles and other pigments are used in combination.

Further, the viscosity of the infrared-absorbing fine particle-containing composition may be required to be a certain value or more at the time of processing, depending on an apparatus used for printing, and the like. Therefore, the viscosity of the infrared-absorbing fine particle-containing composition is preferably 200 mPa·s or more and 20000 mPa·s or less, and more preferably 1000 mPa·s or more and 10000 mPa·s or less.

Under the above circumstances, in the infrared-absorbing fine particle-containing composition according to the present invention, the dispersant is contained in an amount of 10 parts by mass or more with respect to 100 parts by mass of the infrared absorbing fine particles, and it is important that a solvent content is 10 mass % or less, and a content of the infrared absorbing fine particles is preferably 25 mass % or more.

<1> Content of Dispersant

It is important that the content of the dispersant is equal to or higher than a predetermined value, to suppress formation of coarse aggregates of infrared absorbing fine particles in the infrared-absorbing fine particle-containing composition and to ensure dispersion stability of the infrared-absorbing fine particle-containing composition. Although depending on a particle size of the infrared absorbing fine particles and characteristics of the used dispersant, in general, the predetermined value is the same as a crystallite diameter thereof (that is, the infrared absorbing fine particles are dispersed in a state of primary particles), and the crystallite diameter of the infrared absorbing fine particles is 10 nm or more and 70 nm or less, and it is important that the content of the dispersant in the infrared-absorbing fine particle-containing composition is 10 parts by mass or more with respect to 100 parts by mass of the infrared absorbing fine particles. Further, the content of the dispersant is preferably 15 parts by mass or more, more preferably 20 parts by mass or more. When the content of the dispersant is 20 parts by mass or more with respect to 100 parts by mass of the infrared absorbing fine particles, the storage stability of the infrared-absorbing fine particle-containing composition can be further enhanced.

<2> Solvent Content

As described above, from a viewpoint of securing a concentration adjustment allowance for the concentration of the infrared absorbing fine particles, it is preferable that the solvent content in the infrared-absorbing fine particle-containing composition is small. From this viewpoint, it is important that the solvent content of the infrared-absorbing fine particle-containing composition is 10 mass % or less. Further, the solvent content is preferably 5 mass % or less, more preferably 3 mass % or less. When the solvent content of the infrared-absorbing fine particle-containing composition is 3 mass % or less, it is also possible to obtain an effect of sufficiently achieving a level of reduction of environmental load required in recent years, when producing an infrared absorbing fine particle dispersion body using the infrared-absorbing fine particle-containing composition.

<3> Content of the Infrared Absorbing Fine Particles

As described above, from the viewpoint of securing the concentration adjustment allowance for the concentration of the infrared-absorbing fine particles, the higher the content of the infrared absorbing fine particles, the more preferable it is because the concentration adjustment allowance can be secured, and a required range of the concentration of the infrared absorbing fine particles varies depending on its use, the concentration of the infrared absorbing fine particles is preferably 25 mass % or more, from a viewpoint of making the infrared-absorbing fine particle-containing composition according to the present invention highly versatile, and is more preferably 40 mass % or more, further preferably 50 mass % or more, and most preferably 60 mass % or more.

The infrared-absorbing fine particle-containing composition according to the present invention described above has high long-term storage stability despite having a high content of infrared-absorbing fine particles and a low solvent content. As a result, it can be stored for a period of time as needed, and is excellent in application to an infrared-absorbing fine particle dispersion body used in various fields, including printing ink applications and solar radiation shielding applications.

(5) Method for Producing an Infrared-Absorbing Fine Particle-Containing Composition A method for producing an infrared-absorbing fine particle-containing composition according to the present invention will be described.

In order to produce the infrared-absorbing fine particle-containing composition, the above-described infrared absorbing fine particles must be uniformly dispersed in the dispersant. At this time, it is often necessary to atomize infrared absorbing fine particles and adjust their particle size, and a method of pulverizing and dispersing with a medium stirring mill such as a bead mill, a ball mill, a sand mill, or a paint shaker using a medium such as beads, balls, or Ottawa sand, is industrially preferably adopted.

However, in general, an object to be pulverized and dispersed by a medium stirring mill is a low-viscosity dispersion liquid, for example, a dispersion liquid containing 80 parts by mass or more of a solvent with respect to 100 parts by mass of infrared absorbing fine particles.

On the other hand, the infrared-absorbing fine particle-containing composition according to the present invention is a high-viscosity infrared-absorbing fine particle-containing composition that is difficult to pulverize and disperse with a medium stirring mill because it contains almost no solvent.

Therefore, when the infrared-absorbing fine particle-containing composition according to the present invention is produced using a medium stirring mill, first, the method for producing the infrared-absorbing fine particle-containing composition according to the present invention is the most preferable industrial method in which after producing the infrared absorbing fine particle dispersion liquid with a medium stirring mill, the solvent is removed from the infrared absorbing fine particle dispersion liquid by using a method such as a drying treatment, to produce the infrared-absorbing fine particle-containing composition according to the present invention.

Therefore, the method for producing the infrared-absorbing fine particle-containing composition will be described in an order of <1> Production of infrared-absorbing fine particle dispersion liquid, and (2) Production of infrared-absorbing fine particle-containing composition by drying treatment.

<1> Production of Infrared Absorbing Fine Particle Dispersion Liquid

The infrared absorbing fine particle dispersion liquid is a mixture of infrared absorbing fine particles and a dispersant in a solvent and dispersed. Then, when 80 parts by mass or more of the solvent is contained with respect to 100 parts by mass of the infrared absorbing fine particles in the infrared absorbing fine particle dispersion liquid, it is easy to pulverize and disperse with a medium stirring mill, and it is easy to ensure the storage stability as a dispersion liquid.

The method for dispersing the infrared absorbing fine particles and the dispersant in the solvent is not particularly limited as long as it is a method for uniformly dispersing the infrared absorbing fine particles and the dispersant in the dispersion liquid. However, for the above reasons, for example, the method using a medium stirring mill such as a bead mill, a ball mill, a sand mill, or a paint shaker is industrially preferable.

At this time, from a viewpoint of optical characteristics, the crystallite diameter of the infrared absorbing fine particles is preferably sufficiently fine, such as 1 nm or more and 100 nm or less, preferably 10 nm or more and 80 nm or less, and more preferably 10 nm or more and 70 nm or less. This is because when the crystallite diameter is 70 nm or less, it is possible to prevent an infrared absorbing fine particle dispersion body or an infrared shielding film produced later from becoming a grayish one having a monotonously reduced transmittance. Further, when the crystallite diameter is 10 nm or more, the content of infrared absorbing fine particles having low crystallinity is reduced, and a desired infrared absorbing characteristics are exhibited even with a smaller addition amount.

Further, in the infrared absorbing fine particle dispersion liquid, infrared absorbing fine particles aggregate to form coarse agglomerates, and when a large number of the coarse agglomerates are present, they become a light scattering source. As a result, the haze of the infrared absorbing fine particle dispersion body or the infrared shielding film produced later may increase, which may cause a decrease in visible light transmittance. Accordingly, it is preferable to avoid the formation of the coarse agglomerate of infrared absorbing fine particles. For these reasons, it is important to select a dispersant having excellent affinity with the surface of infrared absorbing fine particles, and to adopt a pulverization and dispersion treatment method such as a medium stirring mill that does not easily generate coarse agglomerates.

<2> Production of Infrared-Absorbing Fine Particle-Containing Composition by Drying Treatment The solvent content is reduced to 10 mass % or less by performing drying treatment to the above-described infrared absorbing fine particle dispersion liquid under a condition for avoiding the aggregation of infrared absorbing fine particles, to produce the infrared-absorbing fine particle-containing composition according to the present invention.

As equipment for the drying treatment, an air dryer, a universal mixer, a vacuum flow dryer, and the like are preferable, from a viewpoint that heating and/or depressurizing can be performed, and it is easy to mix and recover the infrared absorbing fine particle dispersion liquid and the infrared-absorbing fine particle-containing composition. In particular, the vacuum flow dryer is more preferable because a drying speed is high and a solvent content in the infrared-absorbing fine particle-containing composition can be easily controlled.

When using composite tungsten oxide fine particles as infrared absorbing fine particles, it is desirable to perform treatment at a temperature at which the element M is not desorbed from the composite tungsten oxide fine particles. Therefore, it is desirable that the drying temperature is higher than the temperature for volatilizing the solvent contained in the solvent, and is 150° C. or lower.

[2] Infrared Absorbing Fine Particle Dispersion Body

An infrared absorbing fine particle dispersion body can be produced by using the infrared-absorbing fine particle-containing composition according to the present invention.

Forms of the infrared absorbing fine particle dispersion body include: for example, infrared absorbing fine particle dispersion powder that is easy to process because infrared absorbing fine particles are dispersed in an appropriate solid dispersant, a masterbatch containing infrared absorbing fine particles that is easy to process because the infrared absorbing fine particles are dispersed in an appropriate pellet-shaped solid resin, an infrared absorbing fine particle dispersion body having a desired shape such as a spherical shape, a board shape, a sheet shape, or a film shape in which the infrared absorbing fine particles are dispersed in an appropriate solid medium; an infrared absorbing base material formed by applying an infrared absorbing fine particle dispersion liquid onto the base material, and a laminated structure including two or more base materials and an intermediate layer sandwiched between the two or more base materials, which is an infrared absorbing laminated structure in which infrared absorbing fine particles are dispersed in the intermediate layer.

The infrared absorbing fine particle dispersion body has the following advantage: since the infrared absorbing fine particles maintain a dispersed state in the solid medium, the infrared absorbing fine particle dispersion body can be easily applied to a base material having a low heat resistant temperature such as a resin material, and it is inexpensive because a large apparatus is not required for formation. Further, when a conductive material is used as the infrared absorbing fine particles according to the present invention and the infrared absorbing fine particles are used as a continuous film, there is a risk of absorbing and reflecting radio waves from mobile phones, etc., and interfering with them. However, in the infrared absorbing fine particle dispersion body, each of the infrared absorbing fine particles is dispersed in a matrix of the solid medium in an isolated state. Therefore, the infrared absorbing fine particle dispersion body is versatile because it has radio wave transmission.

Various resins and glasses can be used as the solid medium of the infrared absorbing fine particle dispersion body.

When the infrared absorbing fine particle dispersion body requires transparency of a visible light, it is possible to preferably form the infrared absorbing fine particle dispersion body in which the infrared absorbing fine particles are sufficiently dispersed, by mixing 80 parts by mass or more of the solid medium with respect to 100 parts by mass of the infrared absorbing fine particles contained in the infrared-absorbing fine particle-containing composition according to the present invention and diluting the solid medium.

[3] Infrared Absorption Effect of the Infrared Absorbing Fine Particle Dispersion Body The infrared absorbing fine particle dispersion body prepared using composite tungsten oxide fine particles as infrared absorbing fine particles is the infrared absorbing fine particle dispersion body having a local maximum value in a wavelength range of 350 nm to 600 nm and a local minimum value in a wavelength range of 800 nm to 2100 nm in terms of light transmittance, and having an optical characteristic of: the local maximum value (%)−the local minimum value (%)≥69 (points) in which the local maximum value and the local minimum value of the transmittance are expressed as a percentage, showing that a difference between the local maximum value and the local minimum value is 69 points or more as a percentage.

The fact that the difference between the local maximum value and the local minimum value of the transmittance in the infrared absorbing fine particle dispersion body is as large as 69 points or more, shows that the infrared absorbing fine particle dispersion body has excellent infrared absorption characteristics.

EXAMPLES

Hereinafter, the present invention will be specifically described with reference to examples. However, the present invention is not limited to the following examples.

An X-ray diffraction pattern of infrared absorbing fine particles was measured by a powder X-ray diffraction method (θ-2θ method) using a powder X-ray diffractometer (X'Pert-PRO/MPD manufactured by PANalytical, Spectris Co., Ltd.), and the crystallite diameter of the infrared absorbing fine particles was calculated by lead belt analysis.

The solvent content in the infrared-absorbing fine particle-containing composition was measured using a moisture meter (MOC63u manufactured by Shimadzu Corporation). The temperature of a sample of an infrared-absorbing fine particle-containing composition was raised from room temperature to 125° C. within 1 minute from the start of measurement, then, kept at a temperature of 125° C. for 9 minutes, and an amount of a volatile component from the infrared-absorbing fine particle-containing composition was obtained from a weight loss rate of the sample 10 minutes after the start of measurement, and used as a solvent content of the infrared-absorbing fine particle-containing composition.

A dispersant content of the infrared-absorbing fine particle-containing composition was measured by a dry gravimetric method. The sample of the infrared-absorbing fine particle-containing composition was dried at a temperature of 100° C. for 60 minutes, and a ratio of a mass after drying to a mass 100 mass % before drying was defined as a solid content, and an amount obtained by subtracting the amount of the infrared absorbing fine particles from the solid content was defined as the dispersant content.

An amount of the infrared-absorbing fine particles in the infrared-absorbing fine particle-containing composition was obtained by measuring elements contained in the infrared-absorbing fine particles using ICP (ICPE9000, manufactured by Shimadzu Corporation). For example, when the infrared absorbing fine particles are hexagonal cesium tungsten bronze ($Cs_{0.33}WOz$, 2.0≤z≤3.0), a tungsten concentration was measured by ICP and converted to the amount of the infrared absorbing fine particles assuming that Z=3.0.

Optical characteristics of the infrared absorbing fine particle dispersion body were measured using a spectrophotometer (U-4100 manufactured by Hitachi, Ltd.). The transmittance of light from a wavelength of 200 nm to a wavelength of 2600 nm was measured in increments of 5 nm, and a visible light transmittance was calculated according to JIS R3106.

A dispersed particle size of the infrared absorbing fine particles in the infrared absorbing fine particle dispersion liquid is shown by an average value measured by a particle size measuring device (ELS-8000 manufactured by Otsuka Electronics Co., Ltd.) based on a dynamic light scattering method.

The viscosity of the infrared absorbing fine particle dispersion liquid was measured using a vibration viscometer (VM-100A manufactured by CBC Materials Co., Ltd.).

Example 1

Composite tungsten oxide powder by Sumitomo Metal Mining Co., Ltd.) containing hexagonal cesium tungsten bronze ($Cs_{0.33}WOz$, 2.0≤z≤3.0) in which the ratio of the amount of substance of cesium (Cs) to tungsten (W) is Cs/W=0.33, was prepared as infrared absorbing fine particles.

A dispersant (solid content 100 mass %, acid value 0 mgKOH/g, amine value 32 mgKOH/g) having an amine-containing group as a functional group and having a polyether structure in a liquid state, and having a glass transition temperature of −72° C. was prepared.

33 parts by mass of infrared absorbing fine particles, 17 parts by mass of dispersant, and 50 parts by mass of propylene glycol monomethyl ether acetate as a solvent were mixed to prepare 3 kg of slurry. This slurry was put into a medium stirring mill together with beads and subjected to pulverization and dispersion treatment for 10 hours to obtain an infrared absorbing fine particle dispersion liquid according to example 1.

A horizontal cylindrical annular type (manufactured by Ashizawa Co., Ltd.) was used as the medium stirring mill, and a material of an inner wall of a vessel and a rotor (rotary stirring part) was zirconia. Further, beads made of YSZ (Yttria-Stabilized Zirconia) with a diameter of 0.1 mm were used, and a rotor rotation speed was 14 rpm/sec and a slurry flow rate was 0.5 kg/min. Here, a dispersed particle size of the $Cs_{0.33}WO_z$ fine particles in the obtained infrared absorbing fine particle dispersion liquid was measured and found to be 100 nm. As a setting for a particle size measurement, a refractive index of the particles was 1.81 and a shape of the particles was non-spherical. Further, a background was measured using propylene glycol monomethyl ether acetate, and a solvent refractive index was 1.40. Further, after removing the solvent (propylene glycol monomethyl ether acetate) of the obtained infrared absorbing fine particle dispersion liquid by drying, the crystallite diameter of the infrared absorbing fine particles was measured and found to be 32 nm.

The above-described operating conditions and measurement results are shown in Table 1.

The solvent was evaporated from the obtained infrared absorbing fine particle dispersion liquid by vacuum flow drying to produce an infrared-absorbing fine particle-containing composition according to example 1.

A vacuum crusher 24P manufactured by Ishikawa Factory Co., Ltd. was used as a vacuum flow dryer. Operating conditions of the vacuum flow dryer were as follows. Temperature: 60° C., degree of vacuum: about −0.1 MPaG, and a rotation speed: 40 rpm.

A solvent content of the produced infrared-absorbing fine particle-containing composition according to example 1 was 2.2 mass %, a dispersant content was 33.2 mass %, and an infrared absorbing fine particle content was 64.6 mass %. Further, the viscosity (24° C.) of the obtained infrared-absorbing fine particle-containing composition was 2000 mPa·s.

The infrared-absorbing fine particle-containing composition according to example 1 was stored for a long period of time at 25° C. for 12 months, and a storage stability was investigated.

As a result, no reaggregation, phase separation, and sedimentation of the infrared absorbing fine particles were observed, and it was found that the infrared absorbing fine particles had sufficiently good storage stability.

The above-described operating conditions and measurement results are shown in Table 2.

10 g of the infrared-absorbing fine particle-containing composition according to example 1 was mixed with 2 g of an ultraviolet curable resin UV3701 (manufactured by Toagosei Co., Ltd.) as a binder to obtain coating film forming ink according to example 1.

A transparent PET film having a thickness of 50 μm was used as a base material, and a surface of the transparent PET film was coated with the coating film forming ink by a bar coater. The formed film was dried at 70° C. for 1 minute to evaporate the contained solvent, then, the surface was irradiated with ultraviolet rays using a high-pressure mercury lamp to cure ultraviolet curable resin, and an infrared absorbing fine particle dispersion body according to example 1 was obtained. At this time, an amount of evaporation of the contained solvent was 0.22 g, which was extremely small.

The optical characteristics of the infrared absorbing fine particle dispersion body according to example 1 were measured by the above-described method. A visible light transmittance was obtained, and a value of a difference between a local maximum value of the transmittance in a wavelength range of 350 nm to 600 nm and a local minimum value of the transmittance in a wavelength range of 800 nm to 2100 nm was obtained as a point, and a transmittance at wavelengths of 500 nm, 1000 nm and 1500 nm was also obtained. The visible light transmittance was 70.3%, and the difference between the local maximum value and the local minimum value of the transmittance was 71.6 points.

Example 2

The same operation as in example 1 was performed to produce an infrared-absorbing fine particle-containing composition according to example 2, except for preparing a dispersant having an amine-containing group as a functional group and having a polyether structure in a liquid state (solid content 100 mass %, acid value 0 mgKOH/g, amine value 45 mgKOH/g) with a glass transition temperature of −66° C.

In the produced infrared-absorbing fine particle-containing composition according to example 2, a solvent content was 1.8 mass %, a dispersant content was 33.4 mass %, and an infrared absorbing fine particle content was 64.8 mass %. Further, the viscosity (24° C.) of the obtained infrared-absorbing fine particle-containing composition was 1800 mPa·s.

The infrared-absorbing fine particle-containing composition according to example 2 was stored at 25° C. for 12 months for a long period of time, and a storage stability was investigated.

As a result, no reaggregation, phase separation, and sedimentation of the infrared absorbing fine particles was observed, and it was found that the infrared absorbing fine particles had sufficiently good storage stability.

The above-described operating conditions and measurement results are shown in Tables 1 and 2.

Example 3

The same operation as in example 1 was performed to produce an infrared-absorbing fine particle-containing composition according to example 3, except for preparing a dispersant having an amine-containing group as a functional group and having a polyether structure in a liquid state, (solid content 100 mass %, acid value 6 mgKOH/g, amine value 48 mgKOH/g) with a glass transition temperature of −85° C.

In the infrared-absorbing fine particle-containing composition according to example 3, a solvent content was 1.7 mass %, a dispersant content was 33.4 mass %, and an infrared absorbing fine particle content was 64.9 mass %. Further, the viscosity (24° C.) of the obtained infrared-absorbing fine particle-containing composition was 1700 mPa·s.

The infrared-absorbing fine particle-containing composition according to example 3 was stored for a long period of time at 25° C. for 12 months, and the storage stability was investigated.

As a result, no reaggregation, phase separation, and sedimentation of the infrared absorbing fine particles was observed, and it was found that the infrared absorbing fine particles had sufficiently good storage stability.

The above-described operating conditions and measurement results are shown in Tables 1 and 2.

Comparative Example 1

30 mass % of hexagonal $Cs_{0.33}WO_Z$ ($2.0 \leq Z \leq 3.0$), which is a composite tungsten oxide, was weighed as infrared absorbing fine particle, 15 mass % of a dispersant having a hydroxystearic acid chain, having fatty acids and amino groups in its structure, having an acid value of 20.3 mgKOH/g, a glass transition temperature of 35° C., and a non-volatile content of 100% was weighed as a dispersant, and 55 mass % of sunflower oil was weighed as a solvent.

These infrared absorbing fine particles, the dispersant, and the solvent were loaded into a paint shaker containing 0.3 mm φ$ZrO_2$ beads, and pulverized and dispersed for 40 hours, then, an infrared absorbing fine particle dispersion liquid according to comparative example 1 was obtained.

The crystallite diameter of the composite tungsten oxide fine particles in the infrared absorbing fine particle dispersion liquid according to comparative example 1 was measured and found to be 32 nm. Further, the dispersed particle size was 81 nm, and the viscosity (24° C.) was 142 mPa·s.

The infrared-absorbing fine particle-containing composition thus obtained was used as it was without evaporating the solvent from the obtained infrared absorbing fine particle dispersion liquid.

In the produced infrared-absorbing fine particle-containing composition according to comparative example 1, the solvent content was 54.7 mass %, the dispersant content was 15.1 mass %, and the infrared absorbing fine particle content was 30.2 mass %.

The infrared-absorbing fine particle-containing composition according to comparative example 1 was stored for a long period of time at 25° C. for 12 months, and the storage stability was investigated. As a result, phase separation due to sedimentation of the infrared absorbing fine particles was observed, and it was found that there was a problem in storage stability.

TABLE 1

| | Infrared-absorbing fine particles-containing composition | | | | | | | | | | | |
|---|---|---|---|---|---|---|---|---|---|---|---|---|
| | Infrared absorbing fine particles | Dispersant | | | | | | Solvent | | Production condition | Infrared absorbing fine particles | |
| | Addition amount (Parts by mass) | Three chains | Solid content (mass %) | Acid value (mgKOH/g) | Amine value (mgKOH/g) | Glass transition temperature (° C.) | Addition amount (Parts by mass) | Kind | Addition amount (Parts by mass) | Pulverization time (hr) | Dispersed particle size (nm) | Crystallite diameter (nm) |
| Example 1 | 33 | Polyether | 100 | 0 | 32 | −72 | 17 | Propylene glycol | 50 | 10 | 100 | 32 |
| Example 2 | 33 | | 100 | 0 | 45 | −66 | 17 | monomethyl ether | 50 | 10 | 100 | 32 |
| Example 3 | 33 | | 100 | 6 | 48 | −85 | 17 | acetate | 50 | 10 | 100 | 32 |

TABLE 2

| | Infrared-absorbing fine particle-containing composition | | | | | |
|---|---|---|---|---|---|---|
| | | Composition | | | | |
| | Drying condition | Solvent amount (mass %) | Dispersant (mass %) | Infrared absorbing fine particles (mass %) | Viscosity (mPa · s) | Long-term storage |
| Example 1 | Vacuum flow | 2.2 | 33.2 | 64.6 | 2000 | High |
| Example 2 | dryer A | 1.8 | 33.4 | 64.8 | 1800 | High |
| Example 3 | Rotation speed: 40 rpm | 1.7 | 33.4 | 64.9 | 1700 | High |

A = Temperature: 60° C., Vacuum degree: approx. −0.1 MpaG

DESCRIPTION OF SIGNS AND NUMERALS

11 Octahedron formed by $WO_6$ units

12 Element M

The invention claimed is:

1. An infrared-absorbing fine particle-containing composition, comprising:

infrared absorbing fine particles, a dispersant, and a solvent, wherein the infrared absorbing fine particles are compounds represented by a general formula MxWyOz, wherein M is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, and x, y and z satisfying $0.001 \leq x/y \leq 1$ and $2.0 \leq z/y \leq 3.0$, a crystallite diameter of the infrared absorbing fine particles is 1 nm or more and 100 nm or less, the dispersant has a polyether structure, has a glass transition temperature of −150° C. or higher and 0° C. or lower, and is contained in an amount of 10 parts by mass or more with respect to 100 parts by mass of the infrared absorbing fine particles, the solvent is present in the composition but in a content of no more than 10 mass % of the composition, and a viscosity of the composition measured at 24° C. is 1,700 mPa·s or more and 2,000 mPa·s or less.

2. The infrared-absorbing fine particle-containing composition according to claim 1, wherein a content of the infrared absorbing fine particles in the composition is 25 mass % or more.

3. The infrared-absorbing fine particle-containing composition according to claim 1, wherein the dispersant has one or more functional groups selected from the group consisting of an amino group, a hydroxyl group, a carboxyl group, a sulfo group, a phospho group and an epoxy group.

4. The infrared-absorbing fine particle-containing composition according to claim 1, wherein the solvent is present in the composition but in a content of 3 mass % or less of the composition.

5. A method for producing an infrared-absorbing fine particle-containing composition, comprising:

mixing and dispersing infrared absorbing fine particles and a dispersant having a polyether structure and a glass transition temperature of −150° C. or higher and 0° C. or lower in 80 parts by mass or more of a solvent with respect to 100 parts by mass of the infrared absorbing fine particles, to produce an infrared absorbing fine particle dispersion liquid; and drying the infrared absorbing fine particle dispersion liquid to produce the infrared-absorbing fine particle-containing composition, wherein the infrared absorbing fine particles are compounds represented by a general formula MxWyOz, wherein M is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, and x, y and z satisfying $0.001 \leq x/y \leq 1$ and $2.0 \leq z/y \leq 3.0$, a crystallite diameter of the infrared absorbing fine particles is 1 nm or more and 100 nm or less, the solvent is present in the composition but in a content of no more than 10 mass % of the composition, and a viscosity of the composition measured at 24° C. is 1,700 mPa·s or more and 2,000 mPa·s or less.

6. The method for producing the infrared-absorbing fine particle-containing composition according to claim 5, wherein the solvent is present in the composition but in a content of 3 mass % or less of the composition.

* * * * *